No. 870,373. PATENTED NOV. 5, 1907.
C. LIVINGSTON.
SPROCKET CHAIN.
APPLICATION FILED MAY 22, 1907.
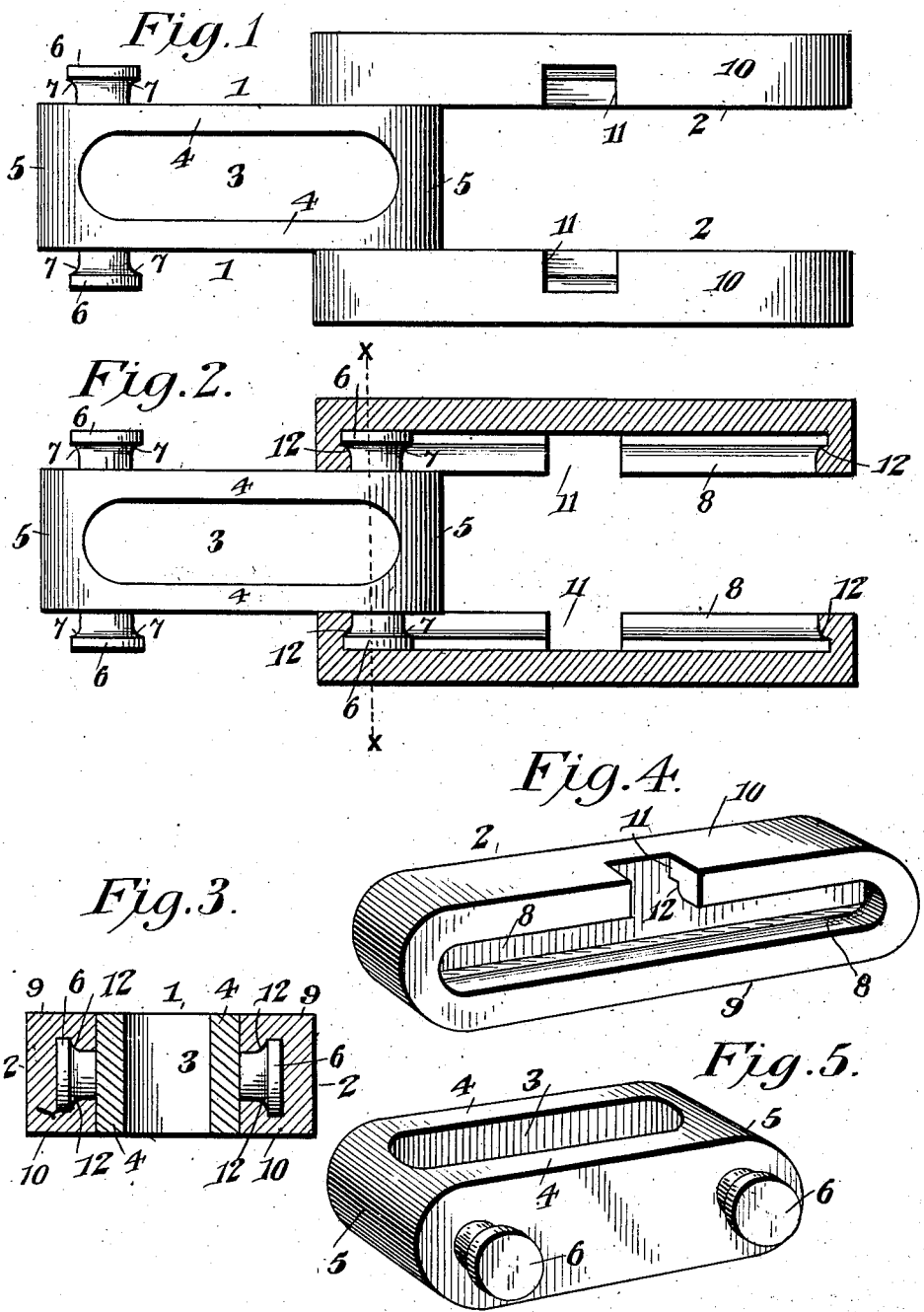
Colin Livingston, Inventor
Witnesses

UNITED STATES PATENT OFFICE.

COLIN LIVINGSTON, OF MUSKEGON, MICHIGAN.

SPROCKET-CHAIN.

No. 870,373.

Specification of Letters Patent.

Patented Nov. 5, 1907.

Application filed May 22, 1907. Serial No. 375,076.

*To all whom it may concern:*

Be it known that I, COLIN LIVINGSTON, a citizen of the United States, residing at Muskegon, in the county of Muskegon and State of Michigan, have invented a new and useful Sprocket-Chain, of which the following is a specification.

The invention relates to improvements in sprocket chains.

The object of the present invention is to improve the construction of sprocket chains, and to provide a simple, inexpensive and efficient one of great strength and durability, designed for use in endless carriers for saw mills and various other places, and provided with links adapted to be readily connected and disconnected.

A further object of the invention is to provide a chain of this character, composed of central and side links and adapted to present flat faces to wooden bearing surfaces to reduce the wear to a minimum, and provided with means for drawing the central and side links tightly together to prevent them from chafing and abrading the sprocket wheels.

With these and other objects in view, the invention consists in the construction and novel combination of parts hereinafter fully described, illustrated in the accompanying drawing, and pointed out in the claims hereto appended; it being understood that various changes in the form, proportion, size and minor details of construction, within the scope of the claims, may be resorted to without departing from the spirit or sacrificing any of the advantages of the invention.

In the drawing:—Figure 1 is a reverse plan view of a portion of a sprocket chain, constructed in accordance with this invention. Fig. 2 is a horizontal sectional view of the same. Fig. 3 is a transverse sectional view on the line $x$—$x$ of Fig. 2. Fig. 4 is a detail perspective view of one of the side links, the same being inverted to show the entrance slot more clearly. Fig. 5 is a detail perspective view of one of the central links.

Like numerals of reference designate corresponding parts in all the figures of the drawing.

1 and 2 designate central and side links of a sprocket chain, designed particularly for use in endless carriers for saw mills and various other places, and consisting of steel castings when employed for heavy work, and adapted to be constructed of malleable iron, when employed for lighter work. The central link, which is provided with a central longitudinal opening 3 to lessen the weight of the link and the cost of the same, has flat upper and lower faces 4 and rounded ends 5. The central link is provided at each end with laterally projecting studs 6, circular in cross section and having heads at their outer ends and beveled at the inner faces thereof to provide inclined or angularly disposed faces 7. The studs, which are integral with the central link, are adapted to engage grooves 8 of the side links 2. The side links 2, which have flat upper and lower faces 9 and 10, are provided at the lower sides of the grooves 8 with entrance slots 11, preferably located at the central portions of the side links, and adapted to permit the headed studs to be quickly introduced into and removed from the longitudinal grooves 8, which terminate short of the ends of the side links to provide end walls, which are curved to conform to the configuration of the studs. The walls of the grooves 8 are continuous at the ends of the side links and at one of the longitudinal edges, and the wall at the opposite longitudinal edge has the said entrance slot 11. As the walls are of uniform thickness, they reinforce the link throughout the length thereof and thereby increase the durability of the same. The flat faces of the central and side links are adapted to reduce to a minimum the wear on wooden supporting surfaces on which the links travel. The side and end walls of the grooves are beveled or undercut to provide inclined or angularly disposed edges or faces 12 to fit the inclined or angularly disposed faces at the inner sides of the heads, whereby when the links are assembled, the central and side links will be drawn tightly together. This will prevent the links from getting out of alinement and abrading and chafing the sprocket wheels.

When the links are employed for carrying logs into a saw mill, or for otherwise handling the material, they may be equipped with any suitable log-engaging spurs or devices, as will be readily understood.

Having thus fully described my invention, what I claim as new and desire to secure by Letters Patent, is:—

In a chain of the class described, the combination of a central link provided at its ends with laterally projecting studs having heads, the latter being provided at their inner sides with inclined or angularly disposed faces, and side links provided at their inner faces with longitudinal grooves extending from one end of the links to the other and having their walls beveled or undercut to form inclined or angularly disposed faces for engaging those of the studs, whereby the faces of the sides are drawn together when the same are interlocked, said walls being of uniform thickness and continuous at the ends and at one of the longitudinal edges of each link and provided at the opposite longitudinal edge with an entrance slot communicating with the groove and located at a point between the ends of the link to permit the studs to be introduced into and removed from the said grooves.

In testimony, that I claim the foregoing as my own, I have hereto affixed my signature in the presence of two witnesses.

COLIN LIVINGSTON.

Witnesses:
OSCAR BERG,
CLARA G. EBERHARDT.